(12) United States Patent
Segovia-Martinez et al.

(10) Patent No.: US 8,139,627 B2
(45) Date of Patent: Mar. 20, 2012

(54) DC OFFSET ESTIMATION IN RECEIVED SIGNALS

(75) Inventors: Manuel Segovia-Martinez, Roquefort les Pins Cedex (FR); Navid Fatemi-Ghomi, Frimley Surrey (GB); Cyril Valadon, Letchworth Hertfordshire (GB)

(73) Assignees: MStar Semiconductor, Inc. (KY); MStar Software R&D, Ltd., Shenzhen (CN); MStar France SAS, Issy les Moulineaux (FR); MStar Semiconductor, Inc. (TW)

( * ) Notice: Subject to any disclaimer, the term of this patent is extended or adjusted under 35 U.S.C. 154(b) by 742 days.

(21) Appl. No.: 11/661,632

(22) PCT Filed: Aug. 15, 2005

(86) PCT No.: PCT/GB2005/003203
§ 371 (c)(1),
(2), (4) Date: Sep. 6, 2007

(87) PCT Pub. No.: WO2006/024817
PCT Pub. Date: Mar. 9, 2006

(65) Prior Publication Data
US 2008/0192862 A1    Aug. 14, 2008

(30) Foreign Application Priority Data
Sep. 2, 2004    (GB) .................................. 0419487.4

(51) Int. Cl.
*H04B 3/46* (2006.01)
*H03H 7/30* (2006.01)

(52) U.S. Cl. .......... 375/226; 375/229; 375/224
(58) Field of Classification Search .......... 375/229–236, 375/226, 240.26–240.29, 319, 318
See application file for complete search history.

(56) References Cited

U.S. PATENT DOCUMENTS

| | | | | |
|---|---|---|---|---|
| 5,684,827 | A | * | 11/1997 | Nielsen .................... 375/232 |
| 6,711,393 | B1 | * | 3/2004 | Stenstrom et al. .......... 455/284 |
| 6,977,970 | B2 | * | 12/2005 | Shim et al. ................ 375/317 |

(Continued)

FOREIGN PATENT DOCUMENTS

EP    1 337 083 A1    8/2003

(Continued)

OTHER PUBLICATIONS

Li Yuanjie, et al., Channel Estimation and Tracking Using Implicit Training, 0-7803-8521-7/04/$20.00 © 2004 IEEE, pp. 72-75.

(Continued)

*Primary Examiner* — David C. Payne
*Assistant Examiner* — Linda Wong
(74) *Attorney, Agent, or Firm* — Edell, Shapiro & Finnan, LLC

(57) ABSTRACT

A scheme for deducing a DC offset in a received signal burst acquired through a particular channel, wherein the received signal burst corresponds to a transmitted signal burst. An impulse response estimate of the channel is used to model how a known or recovered part of the transmitted burst would have been affected by passage through said channel in place of the corresponding part of the transmitted signal burst. The modelled part of the transmitted burst is then compared with the corresponding part of the received signal burst to deduce a DC offset present in the received signal burst.

8 Claims, 4 Drawing Sheets

U.S. PATENT DOCUMENTS

| | | | |
|---|---|---|---|
| 7,349,469 B1 * | 3/2008 | Touzni et al. | 375/232 |
| 7,349,495 B2 * | 3/2008 | Krupka | 375/340 |
| 2001/0016002 A1 * | 8/2001 | Shim et al. | 375/232 |
| 2003/0099310 A1 | 5/2003 | Zvonar | |
| 2005/0084039 A1 * | 4/2005 | Kocic et al. | 375/319 |
| 2008/0013617 A1 * | 1/2008 | Ooi | 375/232 |
| 2010/0260291 A1 * | 10/2010 | Hou et al. | 375/319 |

FOREIGN PATENT DOCUMENTS

| | | |
|---|---|---|
| GB | 2 287 620 A | 9/1995 |
| GB | 2 396 788 A | 6/2004 |
| WO | WO 0131867 A1 * | 5/2001 |
| WO | WO 03/030476 A2 | 4/2003 |

OTHER PUBLICATIONS

Li Yuanjie, et al., "Semi-Blind Mimo Channel Identification Based on Error Adjustment", IEEE Int. Conf. Neural Networks & Signal Processing Nanjing, China, Dec. 14-17, 2003, pp. 1429-1432.

Search Report under Section 17 dated Jan. 17, 2005.

* cited by examiner

DC OFFSET ESTIMATION IN RECEIVED SIGNALS

CROSS-REFERENCE TO RELATED APPLICATIONS

This application is a National Phase Application of PCT/GB2005/003203 filed Aug. 15, 2005, which claims priority to GB 0419487.4 filed Sep. 2, 2004, which is hereby incorporated by reference.

FIELD OF THE INVENTION

The invention relates to apparatus for, and methods of deducing a DC offset in a received signal burst.

BACKGROUND OF THE INVENTION

In a GSM/GPRS/EGPRS communication system, it is well known that the signal received by a mobile station from a base station, or by a base station from a mobile station, is corrupted by various distortions in its propagation. Amongst these distortions, one of the most severe is multipath propagation, whereby the received signal is corrupted by multiple reflections from large objects, such as buildings, in the environment, which reflections are received with different delays. The range of delays encountered is significant compared with the duration of a single digital symbol being transmitted, and means have to be provided to compensate for, or "equalize", this distortion. Commonly, this is achieved by inserting a known "training sequence" at the centre of each transmitted burst. As this sequence is a known signal, the propagation path can be characterized, and then compensated for, by known equalization techniques.

A further distortion introduced into the received signal is DC offset. This can arise for several reasons. For example, most receivers today use direct conversion wherein a received bandpass RF signal is converted into a quadrature representation folded around zero frequency by multiplying by a quadrature local oscillator signal nominally at the channel frequency. The analogue multipliers used are seldom perfect and exhibit DC errors, which may furthermore vary with signal level and temperature. Also, any local oscillator signals that leak into the RF signal path become converted to DC offsets. Also, DC offsets may arise from non-linear distortion of the received signal.

DC offsets have a severe effect on the signal demodulator in a GSM/GPRS/EGPRS system and have to be removed. This can be achieved, to a degree, by analogue signal processing prior to analogue-to-digital conversion.

EGPRS (enhanced general packet radio service) is an evolution towards higher rate transmission for GSM/GPRS mobile communication systems. It introduces several enhancements to increase the spectrum efficiency using the same spectrum otherwise used for conventional GSM transmission, one of which is the introduction of the $3\pi/8$ offset 8PSK modulation scheme in addition to the GMSK modulation used in GSM/GPRS. In ideal conditions (no noise or other transmission artifacts) 8PSK can offer up to three times higher data rate than GSMK modulation. However, $3\pi/8$ offset 8PSK is more sensitive to noise, frequency offset and added DC offset than conventional GMSK.

BRIEF SUMMARY OF THE INVENTION

The invention aims to provide a way of deducing a DC offset in a received signal, so that that offset can, if desired, be eliminated or suppressed.

According to one aspect, the invention provides apparatus for deducing a DC offset in a received signal burst acquired through a particular channel, wherein the received signal burst corresponds to a transmitted signal burst and the apparatus comprises equalizing means for equalizing a first signal which is part of or substantially all of the received burst to produce an equalized signal, modeling means for using an impulse response estimate of said channel to produce a test signal modeling how the equalized signal would have been affected by passage through said channel in place of the corresponding part of the transmitted signal burst and assessing means for comparing the test signal with the corresponding part of the received signal burst to deduce a DC offset present in the received signal burst.

The invention also consists in a method of deducing a DC offset in a received signal burst acquired through a particular channel, wherein the received signal burst corresponds to a transmitted signal burst that is known to contain a training sequence and the method comprises a modeling step comprising using an impulse response estimate of said channel to produce a test signal modeling how a copy of the training sequence would have been affected by passage through said channel in place of the corresponding part of the transmitted signal burst and an assessing step comprising comparing the test signal with the corresponding part of the received signal burst to deduce a DC offset present in the received signal burst.

In certain embodiments, the transmitted signal burst contains a training sequence and the first signal is a part of the received signal burst that corresponds to a part of the transmitted burst that extends from the training sequence towards an end of the received signal burst.

In certain embodiments, the transmitted signal burst contains a training sequence and the first signal has a first part which is a part of the received signal burst that corresponds to a first part of the transmitted signal burst that extends from the training sequence towards an end of the received signal burst and has a second part which is a part of the received signal burst that corresponds to a first part of the transmitted signal burst that extends from the training sequence towards the other end of the received signal burst.

In certain embodiments, the transmitted signal burst contains a training sequence and the first signal is the part of the received signal burst that corresponds to the training sequence.

According to another aspect, the invention also provides apparatus for deducing a DC offset in a received signal burst acquired through a particular channel, wherein the received signal burst corresponds to a transmitted signal burst that is known to contain a training sequence and the apparatus comprises modeling means for using an impulse response estimate of said channel to produce a test signal modeling how a copy of the training sequence would have been affected by passage through said channel in place of the corresponding part of the transmitted signal burst and assessing means for comparing the test signal with the corresponding part of the received signal burst to deduce a DC offset present in the received signal burst.

The invention also relates to a method of deducing a DC offset in a received signal burst acquired through a particular channel, wherein the received signal burst corresponds to a transmitted signal burst that is known to contain a training sequence and the method comprises a modeling step comprising using an impulse response estimate of said channel to produce a test signal modeling how a copy of the training sequence would have been affected by passage through said channel in place of the corresponding part of the transmitted signal burst and an assessing step comprising comparing the test signal with the corresponding part of the received signal burst to deduce a DC offset present in the received signal burst.

In certain embodiments, the DC offset, once deduced, is cancelled from all or part of the received signal burst and equalization is then performed on the resulting signal.

The routines according to the present invention for DC estimation and suppression can be implemented in hardware or as software for execution by suitable data processing hardware. These routines can implemented within, for example, a base station of a wireless communications network or a telephone for use in such a network.

BRIEF DESCRIPTION OF THE DRAWINGS

By way of example only, certain embodiments of the invention will now be described with reference to the accompanying drawings, in which.

DETAILED DESCRIPTION OF THE INVENTION

Figure 1:
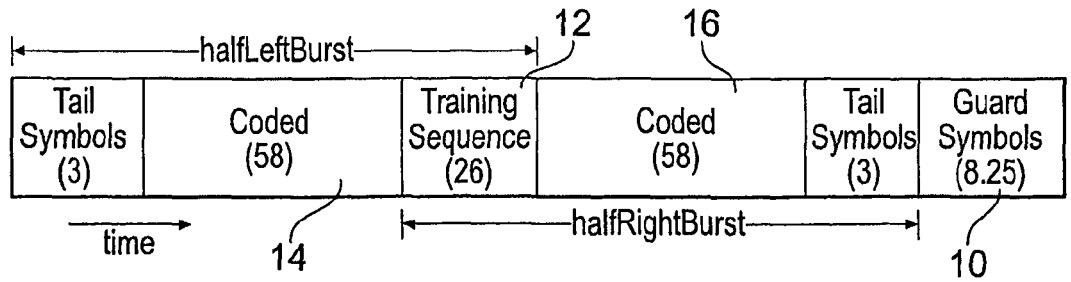
FIG. 1 shows the normal burst structure as defined for EGPRS traffic channels.

The normal structure of a EGPRS burst is shown in FIG. 1. As shown, the burst structure has a few guard symbols 10 at one end. The remainder of the structure has an equalizer training sequence 12 at its centre and some tail symbols at either end. Between each group of tail symbols and the training sequence is a group of coded symbols 14, 16. These coded symbols will convey the information payload of an EGPRS burst and henceforth these symbols will be referred to as "payload symbols" and their sections 14, 16 will be referred to as "payload sections".

Consider the case where an EGPRS burst x conforming to the structure of FIG. 1 is to be transmitted through a channel to a receiver where the burst is acquired as a signal y that contains a DC offset due to, inter alia, direct frequency conversion flaws.

The transmitted burst x can be represented as a vector $x=(x_0, x_1, \ldots, x_{N-1})^T$ where N is the number of symbols in the burst and $x_0$, $x_1$, etc. are the individual symbols within the burst. The channel can be considered to have an impulse response vector of $h=(h_0, h_1, \ldots, h_{L-1})^T$ where L is the length of the channel. On the assumption that this DC offset remains constant for the period that it takes to acquire the signal y, then the DC offset can be represented as a constant vector $m=(m, m, \ldots, m)^T$. Within this framework, the received signal y can also be represented as:

$$y=(y_0, y_1, \ldots, y_{N-L})^T=Xh+m \quad (1)$$

where X is the matrix:

$$X = \begin{bmatrix} x_{L-1} & x_{L-2} & x_{L-3} & \cdots & x_0 \\ x_L & x_{L-1} & x_{L-2} & \cdots & x_1 \\ x_{L+1} & x_L & x_{L-1} & \cdots & x_2 \\ \vdots & \vdots & \vdots & \ddots & \vdots \\ x_{N-1} & x_{N-2} & x_{N-3} & \cdots & x_{N-L} \end{bmatrix} \quad (2)$$

Let vector x' represent an approximation of the transmitted signal x and let matrix X' represent a version of matrix X with its symbols replaced by their equivalents from vector x'. In this scenario, the best possible DC estimate (in the least squares method sense) of value m in vector m is m' and is given by the mean value of the symbols in vector m', which vector is given by:

$$m'=y-X'h \quad (3)$$

Thus, in order to deduce value m', the approximation m' must first be deduced. The signal y is therefore subjected to analogue-domain DC offset compensation and equalization in succession and the equalized burst thus produced is vector x', which is then applied in conjunction with vector h (schemes for measuring the channel impulse response will be readily apparent to the skilled person) in equation (3) to yield vector m' and hence value m'.

The estimate m' of the DC component can then be used to produce a refined version y' of the received signal y according to the equation:

$$y'=y-m'' \quad (4)$$

where m'' is a constant vector $(m', m', \ldots, m')^T$.

The signal y' can then be equalized with a greater likelihood that the result will correctly represent the transmitted signal x.

Figure 2:
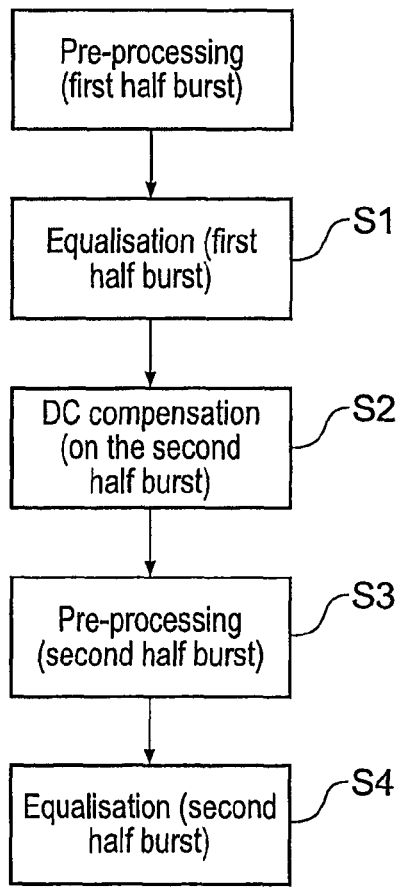
FIG. 2 illustrates an embodiment of the invention in the form of a flow diagram, where the equalization process is divided into two half-bursts.

In one embodiment, the equalization can be processed in half-bursts. With reference to FIG. 1, a "halfLeftBurst" can be defined from the first symbol received up to the end of the training symbols inclusive and a "halfRightBurst" can be defined from the beginning of the training symbols up to the last received symbol of the burst (but excluding, of course, the guard symbols). FIG. 2 shows the proposed processing approach for DC compensation based on half-burst processing.

A first half-burst (which can be either the halfLeftBurst or the halfRightBurst) is equalized as normal at step S1. These equalized symbols are used to estimate the DC offset using equation (3) at step S2. Next, at step S3, the second half-burst is compensated using equation (4). Then, at step S4, the compensated second half-burst is equalized. In principle, it is possible to apply the improved offset estimate to the whole burst and re-equalize the first half too. However, this takes more processing effort and, in practice, a reasonable compromise can be reached by applying the correction to half the burst only (as in FIG. 2).

Figure 3:
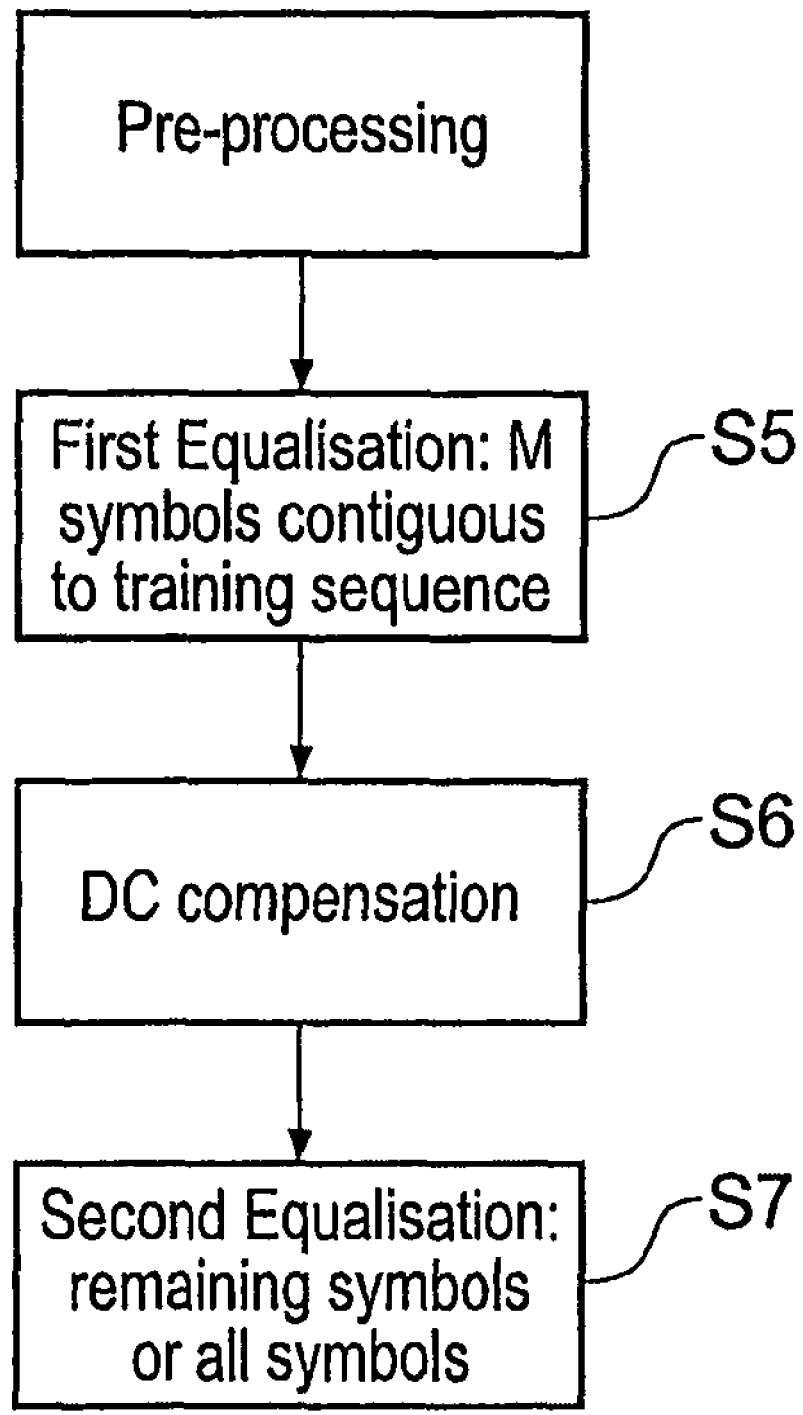
FIG. 3 presents a flow diagram of another embodiment of the invention in which the DC offset estimate is derived from M symbols located around a training sequence.

An alternative embodiment focuses on a group of M payload symbols, M/2 of which are located immediately before the training sequence with the remaining M/2 being located immediately after the training sequence. The symbols adjacent to the training sequence have a lower probability of error than other symbols (in most conditions) since the estimate of the time-varying channel impulse response used in the equalization is derived from the training symbols (the propagation path is time-varying, especially for a receiver in motion, so equalization performance tends to be better for symbols immediately before and after the training sequence). Thus, the DC component in a received burst may be estimated using the part of the payload sections that are closest to the training sequence. For example, the 10 symbols in each payload section closest to the training sequence can be used (which would mean that M=20). FIG. 3 presents a flow diagram of an example of this embodiment.

In step S5, the M symbols around the training sequence are equalized. In step S6, the M equalized symbols are put into equation (3) to calculate the DC offset m' which is then used in equation (4) to generate compensated signal y'. In step S7, the remaining payload symbols (i.e. those not in the group of M symbols that were equalized in step S5) are equalized using signal y' as a basis. Alternatively, the equalization of step S7 can be begun anew (ignoring the M symbols already equalized). Again, the choice in the implementation of step S7 is based on the trade-off between performance and processing time.

Figure 4:
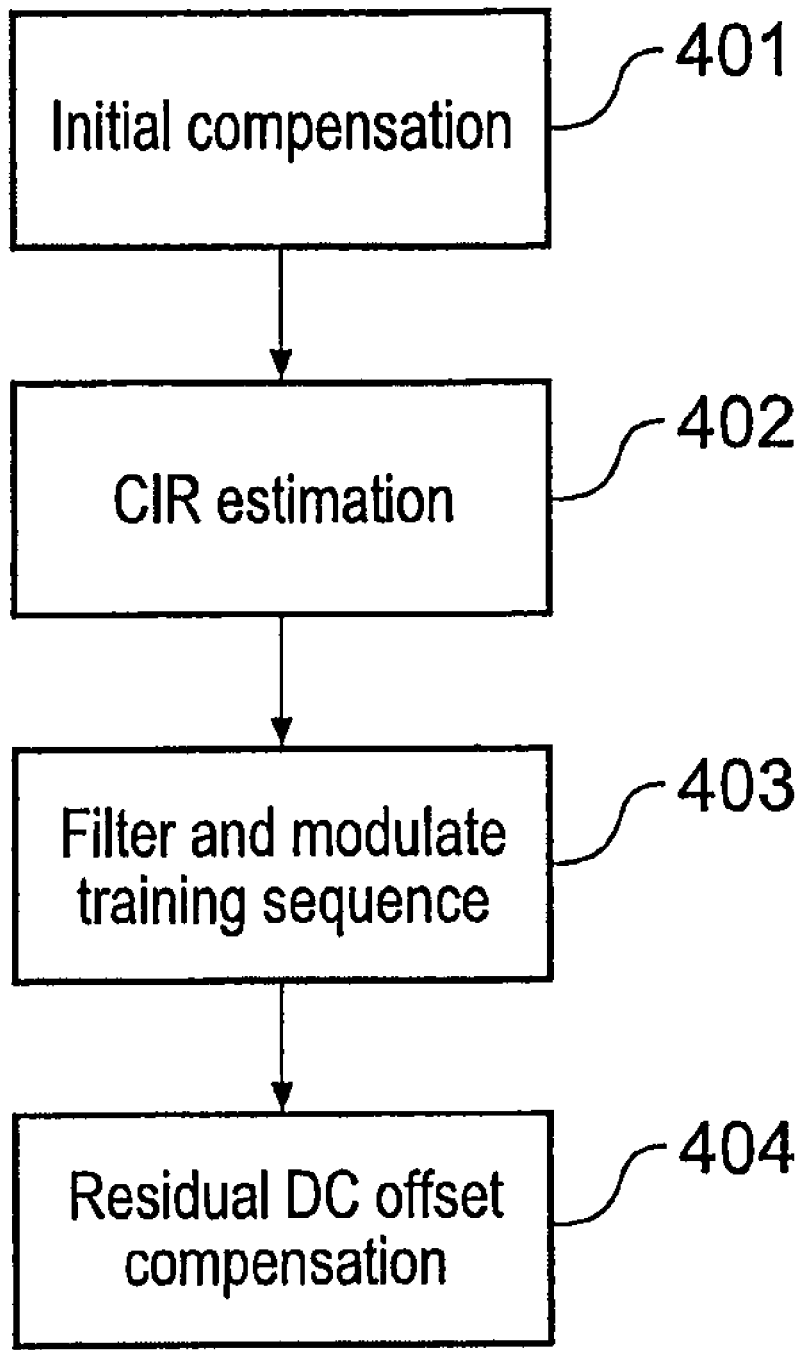
FIG. 4 presents a flow diagram of another embodiment of the invention in which the DC offset estimate is derived from the symbols representing a training sequence.

It is possible to carry out DC offset estimation without the need for first equalizing part or all of the received signal burst. Such an embodiment will now be described in conjunction with FIG. 4.

The received signal burst is provided in an IQ format and an initial DC compensation process 401 is performed on each of the I and Q branches. For each branch, this process comprises averaging the stream of I or, as the case may be, Q symbol components to estimate a DC offset, followed by the subtraction of the offset from the symbol components of the I or, as the case may be, Q stream. The resulting IQ format signal is then used in process 402 to estimate the impulse response of the channel through which the received signal burst arrived. It will be apparent to persons skilled in this art that a number of different approaches can be used to estimate the channel impulse response (CIR).

One possible implementation of the CIR estimation is by the correlation of the received burst that has undergone initial DC compensation with the symbols of training sequence that is known to be used by the received burst. Alternatively, it is possible to perform a linear fit, in the least square sense, of the received burst that has undergone initial DC compensation to the symbols of the training sequence.

Once the CIR has been deduced, it is then used in process 403 to filter the sequence of training symbols. The resulting signal is then used in process 404 to derive an estimate of the residual DC offset. The estimation performed in process 404 is achieved by calculating an average of the difference, on a symbol by symbol basis, between the filtered sequence of training symbols and the corresponding part of the received burst that has undergone initial DC compensation. The computations carried out in process 404 correspond to an implementation of equation (3). The residual DC offset estimate m" is then removed from the received signal in process 405 which implements equation (4) to produce a version of the received burst that can then undergo equalization.

Figure 5:
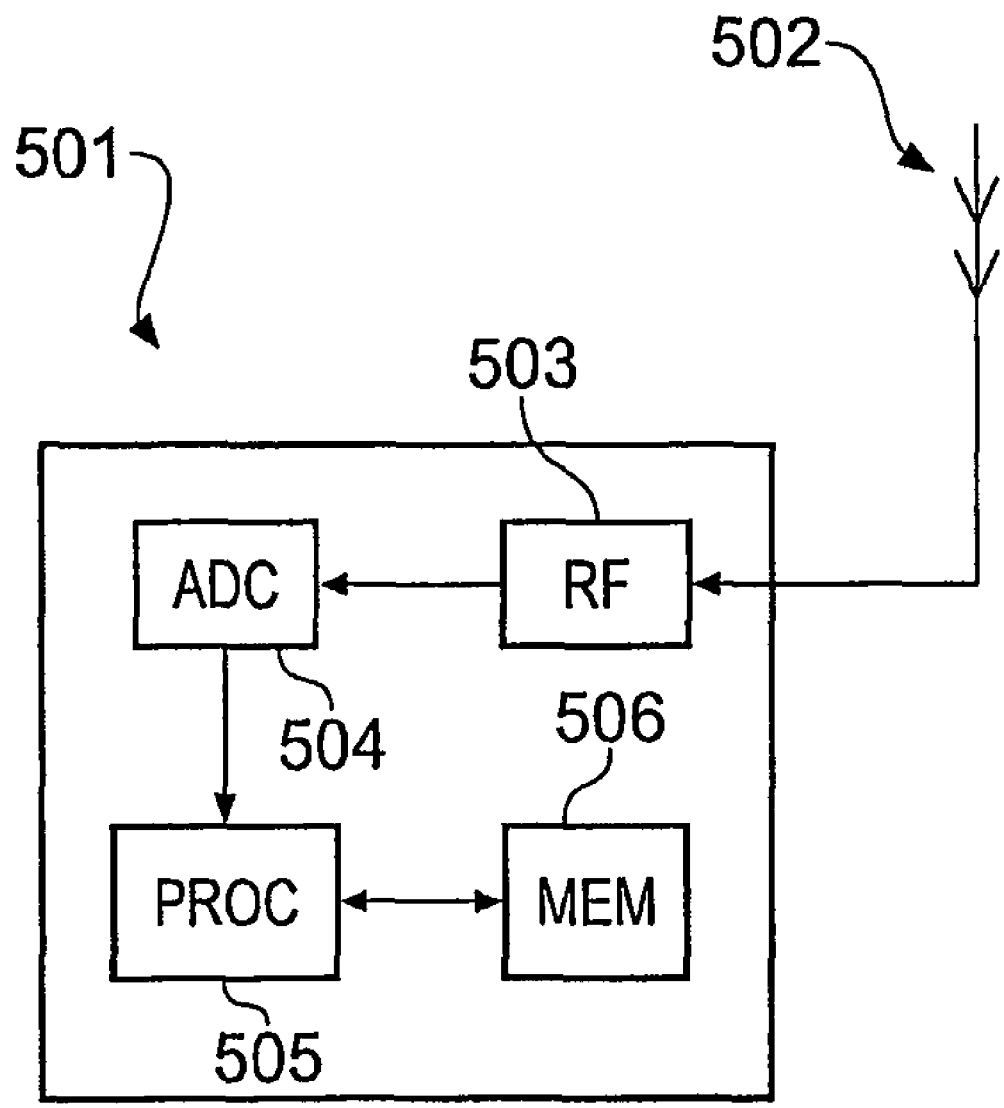
FIG. 5 illustrates a receiver architecture suitable for hosting a DC offset estimation scheme according to the invention.

As was indicated in the introductory portion of this document, the routines described above according to the present invention for DC offset estimation and suppression can, for example, be implemented in a base station of a wireless communications network or a mobile telephone for use in such a network. FIG. 5 illustrates a generic structure that can represent a mobile telephone, base station or similar receiver in which the invention can be implemented. The receiver 501 comprises an antenna 502 for acquiring wireless signals, an RF section 503, an analogue-to-digital conversion (ADC) section 504, a data processor 505 and a memory 506. In practice, the receiver will contain many other elements but only those necessary for an explanation of the implementation of the invention have been shown.

Signals received at the antenna 502 are down-converted in frequency and amplified at RF section 503. The signals are then converted into digital signals by ADC section 504 and passed to processor 505. The processor 505 performs the operations necessary to extract and utilize the information payload of the acquired signals, relying on the memory 506 to provide storage of signal values and other data as required. The processor 505 undertakes the routines described above according to the present invention for DC offset estimation and suppression, such as those outlined in FIGS. 2, 3 and 4.

The invention claimed is:

1. An apparatus for processing a received signal burst acquired through a particular channel, wherein the received signal burst corresponds to a transmitted signal burst and the apparatus comprises a processor arranged to:
   process a first signal which is one part of the received signal burst corresponding to a training sequence in order to generate an impulse response estimate of said channel;
   equalize a signal from a second and different part of the received signal burst to produce an equalized signal;
   produce a test signal modeling how the equalized signal would have been affected by passage through said channel in place of a corresponding part of the transmitted signal burst;
   compare the test signal with the corresponding part of the received signal burst to deduce a DC offset present in the received signal burst; and
   remove the deduced DC offset from another part of the received signal burst other than the first and equalized signals.

2. The apparatus according to claim 1, wherein the second and different part of the received signal burst extends from the training sequence towards an end of the received signal burst.

3. The apparatus according to claim 1, wherein the another part of the received signal burst other than the first and equalized signals extends from the training sequence towards the other end of the received signal burst.

4. A method of processing a received signal burst acquired through a particular channel, wherein the received signal burst corresponds to a transmitted signal burst and the method comprising:
   processing a first signal which is one part of the received signal burst corresponding to a training sequence in order to generate an impulse response estimate of said channel;
   equalizing a signal from a second and different part of the received signal burst to produce an equalized signal;
   producing a test signal modeling how the equalized signal would have been affected by passage through said channel in place of a corresponding part of the transmitted signal burst;
   comparing the test signal with the corresponding part of the received signal burst to deduce a DC offset present in the received signal burst; and
   removing the deduced DC offset from another part of the received signal burst other than the first and equalized signals.

5. The method according to claim 4, wherein the second and different part of the received signal burst extends from the training sequence towards an end of the received signal burst.

6. The method according to claim 4, wherein the another part of the received signal burst other than the first and equalized signals extends from the training sequence towards the other end of the received signal burst.

7. The apparatus according to claim 1, wherein the another part of the received signal burst is further equalized after removal of the deduced DC offset without re-equalizing the one part of the received signal burst.

8. The method according to claim 4, further comprising:
   equalizing the another part of the received signal burst after removal of the deduced DC offset without re-equalizing the one part of the received signal burst.

* * * * *